United States Patent
Trapp et al.

(10) Patent No.: US 6,676,004 B1
(45) Date of Patent: Jan. 13, 2004

(54) TOOL FOR FRICTION STIR WELDING

(75) Inventors: Timothy J. Trapp, Upper Arlington, OH (US); Timothy Stotler, Perry Township, Franklin County, OH (US); Mathew Skilliter, Upper Arlington, OH (US); William C. Mohr, Upper Arlington, OH (US); Mark L. Hunt, Greenwood, SC (US)

(73) Assignee: Edison Welding Institute, Inc., Columbus, OH (US)

( * ) Notice: Subject to any disclaimer, the term of this patent is extended or adjusted under 35 U.S.C. 154(b) by 26 days.

(21) Appl. No.: 10/076,246

(22) Filed: Feb. 12, 2002

Related U.S. Application Data
(60) Provisional application No. 60/269,021, filed on Feb. 13, 2001.

(51) Int. Cl.[7] .......................... B23K 20/12; B23K 37/00
(52) U.S. Cl. .................. 228/2.1; 228/112.1; 29/889.21
(58) Field of Search ................. 228/2.1, 112.1; 29/889.21; 428/544, 598, 600, 615

(56) References Cited

U.S. PATENT DOCUMENTS

| | | | |
|---|---|---|---|
| 4,853,181 A * | 8/1989 | Wert et al. .................. 420/111 |
| 5,460,317 A | 10/1995 | Thomas et al. |
| 5,536,344 A | 7/1996 | van Dreumel |
| 5,611,479 A | 3/1997 | Rosen |
| 5,697,511 A | 12/1997 | Bampton |
| 5,697,544 A | 12/1997 | Wykes |
| 5,718,366 A | 2/1998 | Colligan |
| 5,725,698 A | 3/1998 | Mahoney |
| 5,769,306 A | 6/1998 | Colligan |
| 5,794,835 A | 8/1998 | Colligan et al. |
| 5,893,507 A | 4/1999 | Ding et al. |
| 6,029,879 A | 2/2000 | Cocks |
| 6,053,391 A | 4/2000 | Heideman et al. |
| 6,053,722 A * | 4/2000 | Topolski et al. ............. 425/313 |
| 6,138,895 A | 10/2000 | Oelgoetz et al. |
| 6,168,067 B1 | 1/2001 | Waldron et al. |
| 6,173,880 B1 | 1/2001 | Ding et al. |
| 6,227,430 B1 * | 5/2001 | Rosen et al. .................. 228/2.1 |
| 6,352,193 B1 * | 3/2002 | Bellino et al. ........... 228/112.1 |
| 6,367,681 B1 * | 4/2002 | Waldron et al. ......... 228/112.1 |
| 6,510,975 B2 * | 1/2003 | Enomoto .................. 228/112.1 |
| 6,516,992 B1 * | 2/2003 | Colligan .................. 228/112.1 |
| 6,543,670 B2 * | 4/2003 | Mahoney ................. 228/112.1 |

FOREIGN PATENT DOCUMENTS

| | | |
|---|---|---|
| EP | 810 056 A2 | 12/1997 |
| GB | 2 270 864 A | 3/1994 |
| JP | 5-131280 A | 5/1993 |
| JP | 6-660 A | 1/1994 |
| WO | WO 00/02699 | 1/2000 |

OTHER PUBLICATIONS

Dawes, C.J. and Thomas, W. M., Development of Improved Tool Designs for Friction Stir Weld, Friction Stir Welding Symposium, Jun. 14–16, 1999, The Welding Institute, Thousand Oaks, CA, US.

* cited by examiner

*Primary Examiner*—Tom Dunn
*Assistant Examiner*—Colleen P. Cooke
(74) *Attorney, Agent, or Firm*—Gallagher and Dawsey Co.; David J. Dawsey; Michael J. Gallagher

(57) ABSTRACT

A friction stir welding tool for welding high-strength materials with one or more of the following features: 1) a curved transition geometry structure at the shoulder face and probe interface; 2) a tool material selected on the basis of an ultimate tensile strength determined at or above the temperature of the tool processing temperature; 3) a compressive stress at the point of crack fatigue introduced by mechanical or chemical means; and 4) a threaded probe with a) a major to minor thread diameter ratio that increases toward the distal end of the probe and/or b) with a curved thread root.

21 Claims, 3 Drawing Sheets

TOOL FOR FRICTION STIR WELDING

CROSS REFERENCE TO RELATED APPLICATIONS

This application claims the benefit of U.S. Provisional Application No. 60/269,021 filed on Feb. 13, 2001, all of which are incorporated here by reference as if completely written. herein.

STATEMENT OF FEDERALLY SPONSORED RESEARCH

The U.S. Government has a paid-up license in this invention and the right in limited circumstances to require the patent owner to license others on reasonable terms as provided for the by the terms of Contract No. N00140-96-C-0188, Navy Joining Center Project No. TDL 99-01 awarded by the Office of Naval Research (ONR) and Contract No. F33615-99-2-5215, awarded by the Air Force Research Lab (AFRL).

BACKGROUND OF THE INVENTION

1. Field of the Invention

This invention pertains to friction stir welding and more particularly to a friction stir weld tool with an improved probe structure for welding high-strength aluminum alloys and other hard materials such as steel, copper, nickel, titanium and their alloys.

2. Background and Objects of the Invention

Friction stir welding is a relatively new welding technique discovered in the mid, 1990s that was developed primarily for welding aluminum and soft aluminum alloys that were difficult to weld using traditional welding techniques. The technique uses a rotating shouldered cylindrical tool with a projecting pin to generate heat in the workpiece. The mechanical friction of the rotating tool contacts the workpiece and plasticizes (softens) the metal as it is plunged into the bondline. At this stage, there is a substantial amount of plasticized metal in a column about the rotating pin beneath the shoulder of the cylinder portion of the tool. The tool is then moved along the bondline relative to the workpiece. As the pin rotates and moves in a transverse direction, the metal is plasticized at the front of the pin and extruded to the back of the pin while undergoing a mechanical stirring and forging action imparted by the pin surface profile and confined from above by the pressure exerted on the material by the shoulder of the cylindrical tool. The plasticized metal is transferred from the front of the pin around the periphery of both sides of the pin and subsequently reconstituted at the back of the pin to produce the weld. The rotational and translational (travel) speed are controlled to maintain a plasticized metal state.

The stir weld tool is formed as a cylindrical piece with a shoulder face that meets a pin (probe) that projects from the shoulder face at a right angle (U.S. Pat. Nos. 5,460,317 and 6,029,879). In some instances, the probe actually moves in a perpendicular direction in an aperture formed in the face of the shoulder (U.S. Pat. No. 5,697,544; U.S. Pat. No. 5,718,366; and U.S. Pat. No. 5,893,507). The face of the shoulder can be formed with an upward dome that is perpendicular to the pin (U.S. Pat. No. 5,611,479; U.S. Pat. No. 5,697,544; and U.S. Pat. No. 6,053,391). The dome region and an unobstructed dome (shoulder face)/pin interface are considered essential for the proper frictional heating of the workpiece material. The dome region constrains plasticized material for consolidation at the trailing edge of the friction stir tool rather than permitting it to extrude out from under the sides of the tool. A clean, unobstructed shoulder face/pin interface are considered critical for proper mechanical flow, stirring and mixing of the plasticized workpiece material around the pin during welding and the subsequent mechanical and metallurgical properties of the resultant joint.

Another factor influencing friction stir weld design is the translational (travel) speed at which the tool moves along the bond line. Although tool speeds of 7–15 inches/minute (180–380 mm/min are common in ¼ inch (6 mm) aluminum-alloy stock (BS6082; U.S. Pat. No. 5,460,317), the pin of the tool has a tendency to break as the travel speed or the thickness and/or hardness of the material to be joined increases. Although typically the friction stir weld material is a tool steel material such as H13 (U.S. Pat. No. 6,053, 391), increasing the hot shear strength of the tool material alone or the diameter of the pin has not been the answer to welding thick sections of material, i.e., greater than about 1 inch (25 mm) in thickness ("Development of Improved Tool Designs for FSW [Friction Stir Weld] Aluminum", Chris Dawes and Wayne Thomas, The Welding Institute (TWI), Friction Stir-Welding Symposium" June 1999, Thousand Oaks, Calif.).

Several attempts have been made to avoid the pin breakage problem. When welding thick or hard-material sections, travel speed can be reduced to avoid tool breakage. However, this brings about its own problems. At such slow speeds, the workpiece metal overheats and a dramatic loss in joint efficiency, often of the order of 10–15%, occurs. In addition, the welding process may become so slow as to be economically infeasible. Another solution is to use a double pass welding technique in which the pin is only plunged into the workpiece to slightly over half its thickness and then welded again from the opposite side of the workpiece. Although tool speed and breakage problems are decreased, material handling time and cost increase substantially and the technique may not be applicable where the workpiece configuration prevents access to the second side. Finally considerable effort has been put into the design of the tool pin (probe) with a variety of pin designs having been made (U.S. Pat. Nos. 6,053,391; 6,029,879; 5,460,317 and "Development of Improved Tool Designs for FSW [Friction Stir Weld] Aluminum", Chris Dawes and Wayne Thomas, The Welding Institute (TWI), Friction-Stir Welding Symposium" June 1999, Thousand Oaks, Calif.). However, none of the designs satisfy the need for friction stir welding tool pins that allow for high-speed welding in thick, strong, or hard materials without breakage. In fact, the introduction of sharp angled threads and bosses into the tool may well be one of the sources of high-stress concentration that leads to pin failure.

As such, friction stir welding has been limited to relatively soft materials such as plastics and soft aluminum alloys in the 1xxx, 5xxx, and 6xxx aluminum series for joints with thickness in the ranges of ½₂ in (0.79 mm) to ½ in (13 mm). For stronger aluminum alloys such as the 2xxx and 7xxx series, workpieces of a thickness less than about ½ in (13 mm) are the limit for good stir friction welds.

Unfortunately, as the joint thickness is increased above about ½ in (13 mm) thick on aluminum alloys with ultimate tensile strengths greater than about 50 ksi at welding speeds above 2 inches/min, friction stir welding becomes a less effective joining process due to tool failure or short tool life. Typically, most tools built according to the teachings of the state of the art, fail after only a few inches of travel when welding in harder materials. Typically the length of travel before pin fracture is less than 12-inches of travel leaving the fractured pin solidified in the workpiece.

Accordingly, it is an object of the present invention to provide a friction stir welding tool. capable of welding high strength materials while providing high strength in the resulting weld without pin fracture.

It is another object of the present invention to provide a friction stir welding tool capable of welding thick materials while providing high strength in the resulting weld without pin fracture.

It is another object of the present invention to provide a friction stir welding tool capable of welding thick high-strength materials while providing high strength in the resulting weld without pin fracture.

It is another object of the present invention to provide a friction stir welding tool capable of welding high-strength and/or thick materials at relatively high speed.

It is another object of the present invention to provide a friction stir welding tool with a thread pattern that reduces areas of high-stress concentration.

It is another object of the present invention to provide a friction stir welding tool that avoids the need for double pass welding.

It is another object of the present invention to provide a friction stir welding tool that increases the speed of the welding process.

It is another object of the present invention to provide a friction stir welding tool that decreases the cost of the friction stir welding process.

It is yet another object of the present invention to provide a friction stir welding tool that results in high joint efficiency.

SUMMARY OF THE INVENTION

In order to meet these objects, the present invention of a friction stir weld tool comprises a cylinder having a first end for attachment to a rotating drive, a longitudinal axis, a shoulder, and a shoulder face that is substantially perpendicular (normal) to the longitudinal axis. An integral probe (tip) projects from the shoulder face with an axis that is co-extensive with the cylinder axis. The invention features an integral transition geometry structure between the shoulder face and the probe that has the advantage of substantially reducing rotary bending fatigue and subsequent breakage of the tool. Typically the transition geometry structure is a curved transition geometry structure that typically has a radius of curvature of at least about $0.040$ inches$+0.015(t-0.010)^{1.5}$ where t is the length of the probe from its base to its distal end.

Another feature of the invention is the selection of a tool material on the basis of mechanical properties such as the ultimate tensile strength at the processing temperature of the work piece material rather than at room temperature. For example, it has been found that the ultimate tensile strength of the tool decreases significantly in going from room temperature to the tool operating temperature. Selecting the tool material on the basis of its ultimate tensile strength at the tool operating temperature rather than at room temperature has the advantage of dramatically reducing the amount of tool breakage.

Another feature of the present invention is the introduction of compressive stress in areas of fatigue cracking such as at the base of the probe and in the threaded area of the probe. Such stress may be introduced by mechanical processing such as peening and shot blasting or by chemical processing such as nitriding, carbonizing, and carbonitriding and have the advantage of improving fatigue resistance.

Yet another feature of the instant probe is the modification of the probe threads by adding a generous root radius (rounded root) at the root of the thread and using a ratio of the major diameter of the threads to the. minor diameter of the threads that increases from the base of the probe to its distal end. This has the advantage of improving dramatically the life of the tool by substantially reducing the high stress concentrations inherent in sharp threads and especially those found at the base of the probe where the stresses are at their highest.

By using one or more of these features, a friction stir weld tool can be made that is capable of welding a wide variety of thick, high strength materials including aluminum, aluminum-based alloys, copper, copper-based alloys, iron, iron-based alloys, titanium, titanium-based alloys, nickel, nickel-based alloys and combinations thereof.

The foregoing and other objects, features and advantages of the invention will become apparent from the following disclosure in which one or more preferred embodiments of the invention are described in detail and illustrated in the accompanying drawings. It is contemplated that variations in size, workpiece thickness, welding speeds, structural features and probe thread arrangement may appear to a person skilled in the art without departing from the scope of or sacrificing any of the advantages of the invention.

Figure 1:
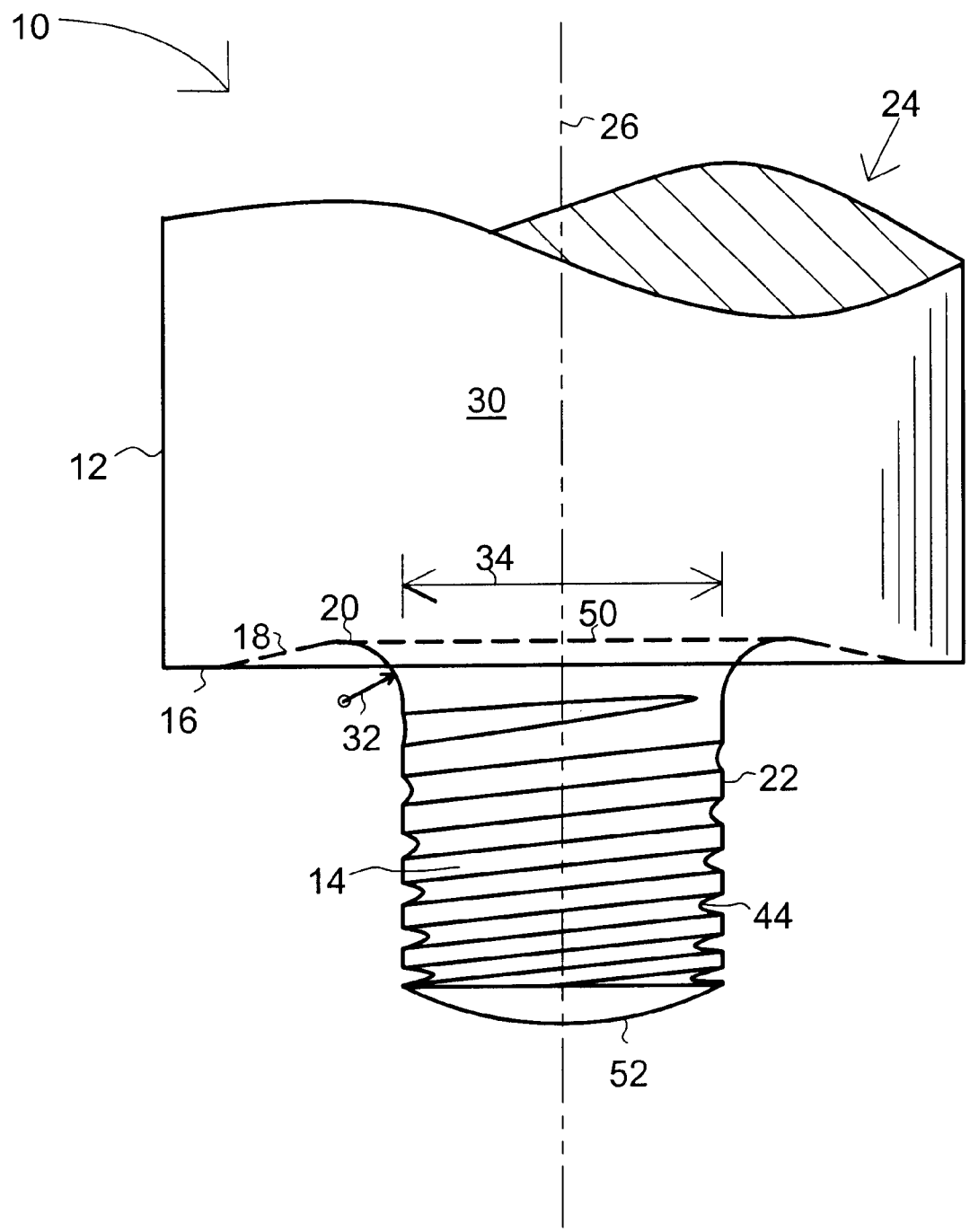
FIG. 1 is a plan view of the friction stir welding tool of the present invention with a partially cut away cylinder portion illustrating a constant volume probe thread with increasing root depth toward the probe tip.

In describing the preferred embodiment of the invention which is illustrated in the drawings, specific terminology is resorted to for the sake of clarity. However, it is not intended that the invention be limited to the specific terms so selected and it is to be understood that each specific term includes all technical equivalents that operate in a similar manner to accomplish a similar purpose.

Although a preferred embodiment of the invention has been herein described, it is understood that various changes and modifications in the illustrated and described structure can be affected without departure from the basic principles that underlie the invention. Changes and modifications of this type are therefore deemed to be circumscribed by the spirit and scope of the invention, except as the same may be necessarily modified by the appended claims or reasonable equivalents thereof.

DETAILED DESCRIPTION OF THE INVENTION AND BEST MODE FOR CARRYING OUT THE PREFERRED EMBODIMENT

Figure 2:
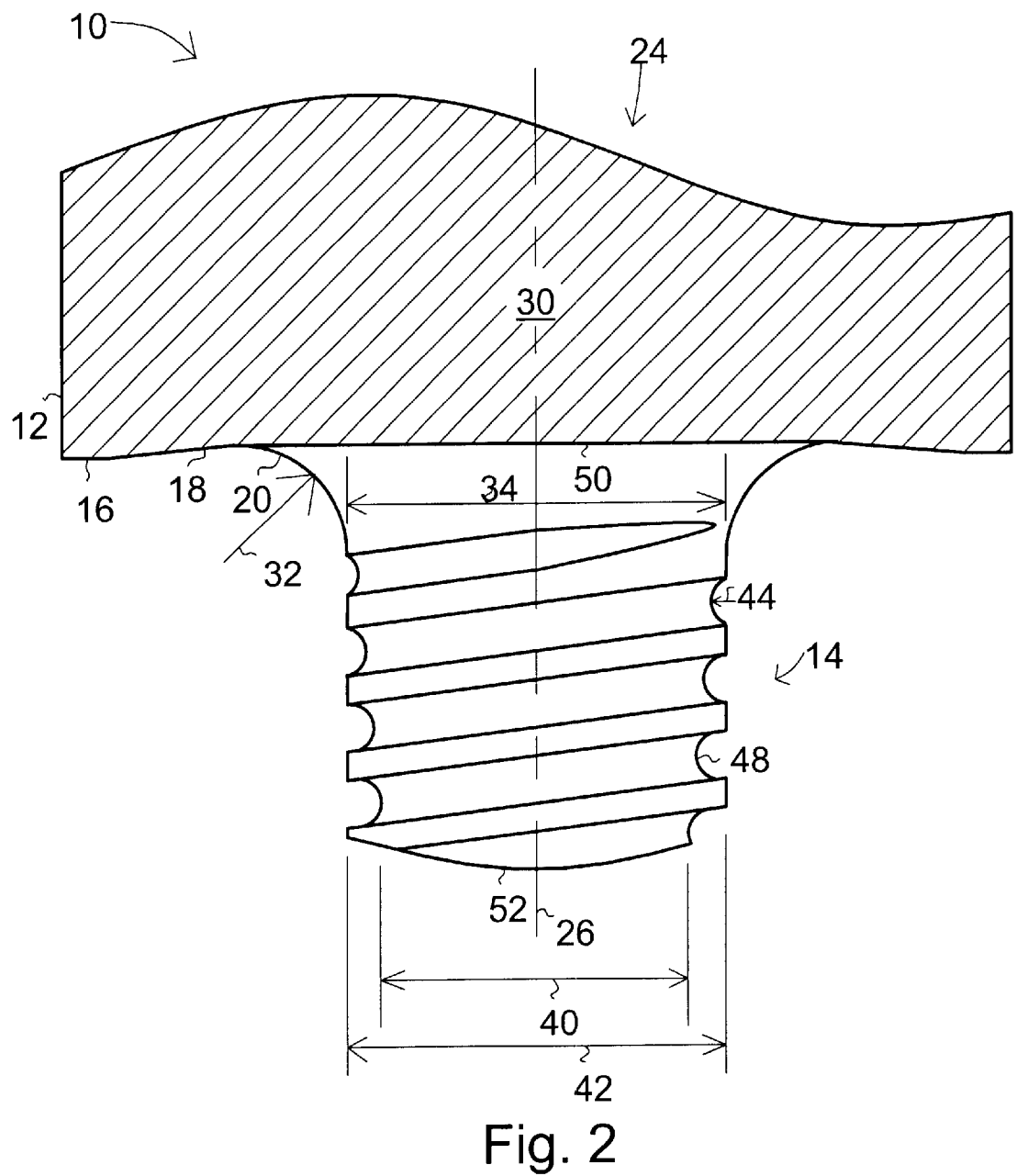
FIG. 2 is a plan view of a second embodiment of the friction stir welding tool of the present invention partially cut away at the shoulder portion which is shown in cross section through the axis of the tool and further illustrating a probe thread root depth that increases from the base to the tip of the probe.

With reference to the drawings and initially FIGS. 1 and 2, a friction stir welding tool 10 is shown having a cylinder 30 with a first end 24 for attachment to a rotating drive for rotation about longitudinal axis 26, a shoulder 12, and a shoulder face 16 opposite first end 24. A probe (tip) 14 projects at a substantially right angle to the shoulder face 18 and is integral with shoulder 12. Probe 14 has a longitudinal axis that is co-extensive with the cylinder axis 26. The present invention contemplates a wide variety of probe shapes and styles including but not limited to threaded, un-threaded, cylindrical, truncated cone, reverse truncated cone, and bossed probes and various combinations thereof.

The present invention features the addition of a transition geometry region 20 at the intersection of the shoulder face 16 and base 50 of probe 14 has been found to significantly increase the operational life of tool 10. When combined with other new features such as a tapered thread root 48 that increases in depth from the base 50 of the probe 14 to its distal end 52 and an increase in tool material strength, the operational life of the tool has been unexpectedly increased by a factor of over fifty times. This has the advantage of allowing the tool to operate at faster speeds or in thicker materials or in harder materials or various combinations of the three and affords cost saving and welding ease not previously possible.

Typically the shoulder 12 of tool 10 is formed with a dome 18 that allows for the proper flow, mixing and forging of plasticized workpiece material that flows from the front of the probe as the probe moves in the welding direction. In the past, the domed shoulder face 18 met the probe at essentially a right angle to provide ample space within the domed region to allow for the proper flow of plasticized material during the welding process. Although the dome 18 can be eliminated, plasticized material tends to flow out from under the tool at the radial extremity of the shoulder face 16 and reduce the quality of the weld. In the past it has been held that interference with the shape of the domed structure 18 including the right-angled junction at the shoulder face 16 and the base 50 of the probe 14 would reduced the quality and strength of the weld due to a loss of frictional heating, loss of material constraint, or both.

Unexpectedly the addition of an integral transition geometry structure 20 at the intersection of the shoulder face 16 and the base 50 of the probe 14 did not result in these anticipated detrimental effects. In fact the addition of a transition geometry structure improved the mechanical properties of the weld at high travel speed without tool fracture. Overall, the welds showed a twenty percent improvement in strong and a twenty percent improvement in ductility. Such weld improvements are due to the increased travel speeds at which the tool can operate which reduces the overall heat input to the joint and minimizes thermal effects on the workpiece material. With the addition of the transition geometry structure 20, it has been found that the life of the tool 10 increases dramatically from a few inches of welding length to over fifty feet of weld without tool fracture on high strength one inch thick (254 mm) aluminum alloy.

Figure 3:
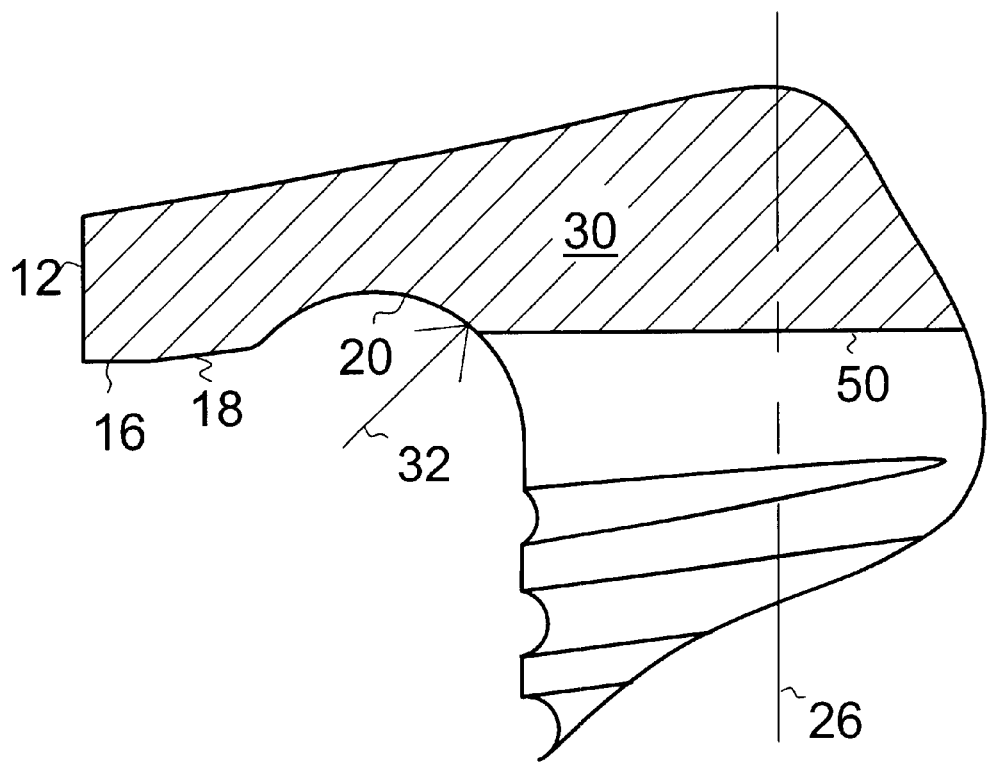
FIG. 3 is a portion of a third embodiment of a friction stir weld tool in which the cylinder portion is in cross-section through the diameter of the cylinder and which illustrates a curved transition geometry structure that is formed and extends into the cylinder portion (shoulder face) of the tool.
Figure 4:
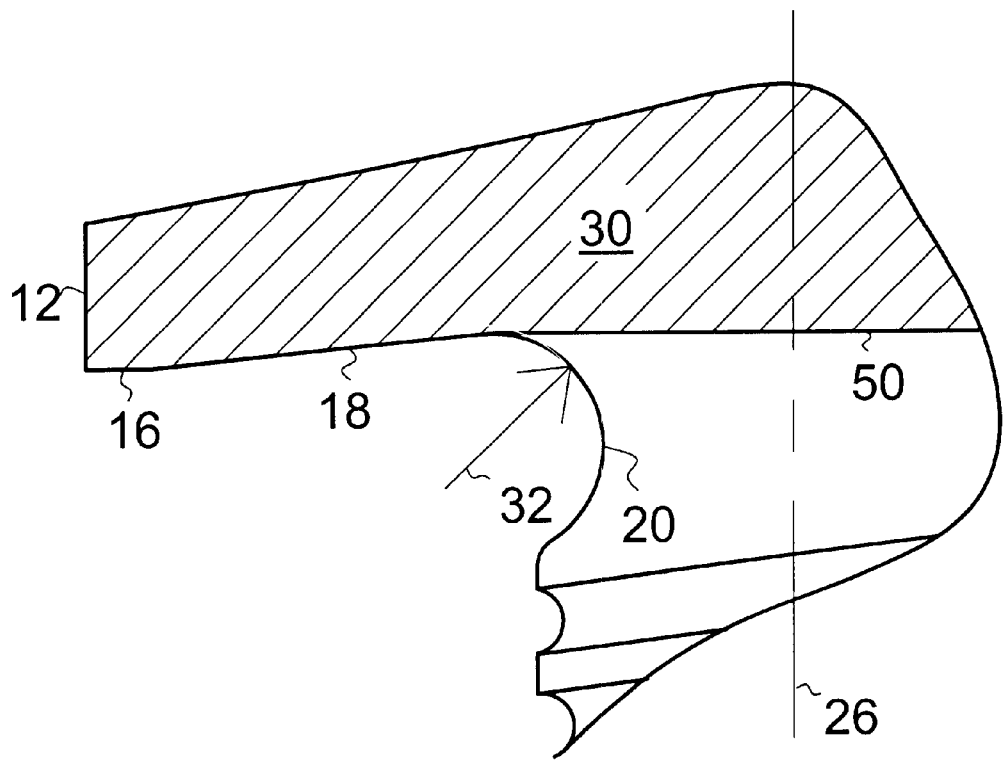
FIG. 4 is a portion of a fourth embodiment of a friction stir weld tool in which the cylinder portion is in cross-section through the diameter of the cylinder and which illustrates a curved transition geometry structure that is formed and extends into the probe portion of the tool.

Any transition geometry structure that reduces rotary bending fatigue is contemplated by the invention including conical, curved or complex curve structures including those that are formed and project into the shoulder face 16 (FIG. 3) or into the probe 14 (FIG. 4) of the tool. The object of such a structure is to minimize and/or eliminate sharp angles in the tool material that lead to bending fatigue. As used here, the transition geometry structure 20 is defined to include any additional structure not present as a result of standard tool making practice necessary to form or cut an essentially right angle between the probe 50 and the shoulder face 16 which includes the dome surface 18, that is, the deepest point at which the dome extends into the shoulder 12, i.e., probe base 50.

A typical curved transition geometry structure 20 of the present invention as shown in the FIGS. 1–4 has a radius of curvature of at least about $0.040 \text{ inches} + 0.015(t-0.010)^{1.5}$ where t is the probe length, that is, the length of the probe from the base 50 to the distal end 52 of the probe 14. It is also to be realized that typically the diameter of the probe and its length are about equal and therefore the above equation may also be defined in terms of the diameter of the probe 34 rather than its length. However, because the diameter and length of the probe can vary considerably with respect to each other and because the probe length is set according to the desired depth of penetration into the material being welded, the probe length is considered a better parameter for use in the equation.

The diameter of the cylinder 30 is typically about 1.5 to 4 times the diameter of the probe 34. The dome is typically formed as a 2–100 taper to a shoulder face 16 normal to the diameter 26 of cylinder 30.

It has been found that the determination of mechanical properties of the tool material affecting tool life (e.g., ultimate tensile strength, wear properties, notch toughness, etc.) at the processing temperature of the tool rather than at traditional room temperature and subsequent selection of a tool material based on the tool processing temperature properties dramatically reduces tool breakage. For example, for an aluminum or aluminum alloy having a plasticized workpiece material temperature (workpiece processing temperature) of about 600–800° F. (315–427° C.), the selection of tool materials with an ultimate tensile strength above about 150 ksi at or above the operating temperature of the tool (approximately the plasticized temperature or processing temperature of the work piece) extends tool life dramatically. It has been found that high strength or tool steel alloys such as 8620, H11, and H13 with an ultimate tensile strength of lower than about 150 ksi at room temperature suffer considerable loss of strength at the operating temperature of the tool, i.e., at approximately the workpiece processing temperature (about 600 to 800° F. (315–427° C.

As such, it is highly desirable in the friction stir welding of aluminum and aluminum alloys to use tool materials with an ultimate tensile strength of at least about 150 ksi at the operating temperature of the tool. Preferably, tool materials such as maraging tool steels 250 and 350 with an ultimate tensile strength of at least about 200 ksi or even at least about 275 ksi at 800° F. (427° C.) are needed for the stir welding of high strength and/or thick aluminum and aluminum alloy workpiece materials. Table 1 illustrates the improvement in tool life by increasing the ultimate tensile strength of the tool material and providing a transition geometry structure 20 at the base 50 of the probe 14. By selecting the tool material on the basis of determinations of mechanical properties such as the ultimate tensile strength of the work tool material at the tool processing temperature rather than at room temperature, the life of other tool materials such as refractory metals and alloys may also be extended significantly.

TABLE 1

Friction Stir Welding of 0.5 in (13 mm)
2519 aluminum at 6 in (152 mm) per minute

| Tool Material and Geometry | Length of Weld to Probe Breakage |
| --- | --- |
| 1. H13 without transition geometry. Standard UNC ½–13 Threads. | 4 inches (102 mm). Breakage at base of probe. |
| 2. Hardened 8620 (Rc 50-52) without transition geometry Standard UNC ½–13 Threads. | 8 inches (203 mm). Breakage at base of probe. |
| 3. Hardened 8620 (Rc 50-52) with curved transition geometry of 4 and ½–13 UNC threads. | Tool did not break. Broke when speed increased to 8 in (203 mm) per minute. Breakage at thread nearest base rather than at base of probe. |
| 4. Maraging steel (350 M) with transition geometry ratio of 3.5 and standard ½–13 UNC threads. Probe ½ in (12.5) mm long. | No failure at 80 inches (2.0 m) at speed of 8 in (203 mm) per minute. |
| 5. Same as 5. except thread root curved and increased in depth from base to tip. Probe 1 in (25 mm) long. | No breakage at 3.5 in (89 mm) per minute in 1 in (25 mm) thick 2519 aluminum. |
| 6. Same as 6 except probe 1.5 (38 mm) long. | No breakage at 2.0 in (51 mm) per minute in 1.5 in (38 mm) thick 2519 aluminum. |

In addition to the above methods, various additional methods may be used to improve fatigue resistance. These methods impart compressive residual stress and include the following: 1) mechanical methods such as peening or shot blasting and 2) chemical methods such as nitriding, carborizing and carbonitriding. Typically these methods are especially useful in 1) the region of the integral transition geometry 20 between probe base 50 and shoulder face 16 and 2) the thread region of probe 14. These methods introduce compressive stresses at the point of the greatest buildup of shear and bending fatigue stresses. Such methods improve the endurance limit of the tool by a factor of about 1.5 with lower strength steels such as 8620, H11, and H13 and show less improvement with high strength steels such as maraging steel 250 or 350.

In addition to the above features, it has been found that modifications in the probe thread structure also improves probe life. One of these modifications consists of reducing the depth of the thread root 48 near the base 50 of the probe 14. That is, the depth of the root 48 increases on going from the probe base region 50 (zero thread root depth) to the distal end of the probe 52 where the root depth is at its maximum, i.e., the ratio of the major diameter of the threads 42 to the minor diameter of the threads 40 increases from the probe base 50 to the distal end-52 of the probe 14. Additionally, it has been found beneficial to provide the base of the thread with a large root radius, i.e., rounded root 44. These thread features have the advantage of substantially reducing the high-stress concentrations inherent in sharp threads. Such stress reduction is especially critical at the base 50 of the probe 14 where bend fatigue stresses are at a maximum level. The features of an increasing thread root depth toward the distal end 52 of the probe 14 with a large root thread radius encourages proper mixing of the plasticized material by the probe 14, yet is designed for maximum fatigue performance where stresses are highest.

As a result of the various friction stir weld tool improvements demonstrated in the present invention, it is possible to use the friction stir weld method to weld a variety of thick, high strength workpiece materials with extended tool life while improving welding speed and lowering the cost of the welding process. Such high-strength workpiece materials include aluminum, aluminum-based alloys, copper, copper-based alloys, iron, iron-based alloys, titanium, titanium-based alloys, nickel, nickel-based alloys and various combinations thereof.

It is possible that changes in configurations to other than those described and illustrated could be used but that which is shown is preferred and typical. Without departing from the spirit of this invention, various other high strength tool materials and properties meeting the requirements of the above description, other means of introducing compressive residual stress at the fatigue point, and other probe thread styles and arrangements may be used. Pat. such as U.S. Pat. Nos. 5,460,317 and 6,053,391, all of which are incorporated here by reference as if completely written herein provide basic details of the use of the friction stir weld tool in the friction stir weld process.

It is therefore understood that although the present invention has been specifically disclosed with the preferred embodiment and examples, modifications to the design concerning sizing, shape, and probe threads or lack thereof will be apparent to those skilled in the art and such modifications and variations are considered to be equivalent to and within the scope of the disclosed invention and the appended claims.

What is claimed is:

1. A friction stir welding tool comprising:
    a) a cylinder having:
        1) a first end for attachment to a rotating drive;
        2) a longitudinal axis;
        3) a shoulder, and
        4) a shoulder face substantially perpendicular to said longitudinal axis;
    b) an integral probe projecting from said shoulder face having an axis co-extensive with said cylinder longitudinal axis; and
    c) an integral transition geometry structure at the interface of said shoulder face and said probe.

2. The friction stir weld tool according to claim 1 wherein said integral transition geometry structure is a curved transition geometry structure.

3. The friction stir weld tool according to claim 2 wherein said curved transition geometry structure has a radius of curvature of at least about $0.040 \text{ inches} + 0.015(t-0.010)^{1.5}$ where t is the probe length.

4. The friction stir weld tool according to claim 2 wherein said curved geometry is formed and extends at least partially into said shoulder face.

5. The friction stir weld tool according to claim 2 wherein said curved geometry is formed and extends at least partially into said probe.

6. The friction stir weld tool of claim 1 further comprising a tool material selected on the basis of a mechanical property determined at or above the tool operating temperature.

7. The friction stir weld tool of claim 1 in which a compressive stress is introduced in an area of fatigue cracking.

8. The friction stir weld tool of claim 7 in which said compressive stress is introduced by mechanical processing.

9. The friction stir weld tool of claim 8 in which said mechanical processing is selected from the processing group consisting of peening and shot blasting.

10. The friction stir weld tool of claim 7 in which said compressive stress is introduced by chemical processing.

11. The friction stir weld tool of claim 10 in which said chemical processing is selected from the chemical processing group consisting of nitriding, carbonizing, and carbonitriding.

12. The friction stir weld tool of claim 1 wherein said probe is a truncated conical probe.

13. The friction stir weld tool of claim 1 wherein said probe is an inverted truncated conical probe.

14. The friction stir weld tool of claim 1 wherein said probe is a threaded probe.

15. The friction stir weld tool of claim 14 wherein said threaded probe has a rounded root thread.

16. The friction stir weld tool of claim 14 wherein the ratio of the major diameter of the threaded probe to the minor diameter of the threaded probe increases from the base of said probe to the distal end of said probe.

17. The friction stir weld tool of claim 14 wherein the width of the thread crests of said threaded probe decreases from the base of said probe to the distal end of said probe.

18. The friction stir weld tool of claim 14 wherein the width of the thread roots of said threaded probe decreases from the base of said probe to the distal end of said probe.

19. The friction stir weld tool of any one of claims 1–18 in which said tool is used to weld a workpiece made from one of the materials in the group of materials consisting of: aluminum, aluminum-based alloys, copper, copper-based alloys, iron, iron-based alloys, titanium, titanium-based alloys, nickel, nickel-based alloys and combinations thereof.

20. A friction stir weld made with a friction stir weld tool according to claim 19.

21. A friction stir welding tool for friction stir welding of aluminum and aluminum alloy materials that have a strength greater than about 50 ksi at room temperature comprising a cylinder with a shoulder and shoulder face and an integral probe formed with an interface of substantially a right angle with said shoulder face with at least one of the following: 1) a curved transition geometry at said interface; 2) tool material with an ultimate tensile strength of at least about 275 ksi at or above the tool operating temperature; 3) an introduction of a compressive stress at the point of crack fatigue in said welding tool; 4) a threaded probe with a curved thread root; and 5) a threaded probe in which the ratio of the major diameter to the minor diameter of the threads increases from the shoulder face/probe interface to the distal end of the probe.

* * * * *